April 17, 1956  A. W. RUSSELL  2,742,388
REINFORCED PLASTIC STRUCTURAL MEMBER
Filed June 18, 1954
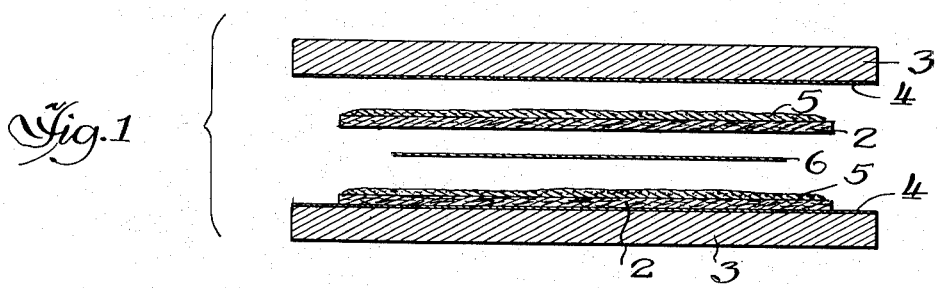
Fig.1
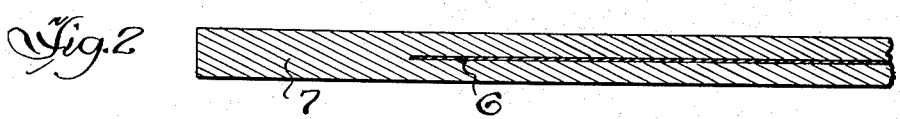
Fig.2
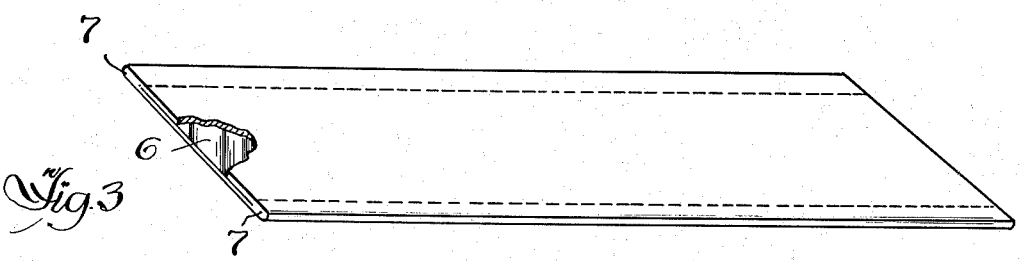
Fig.3
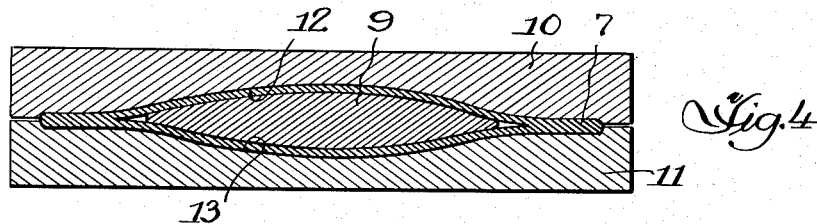
Fig.4
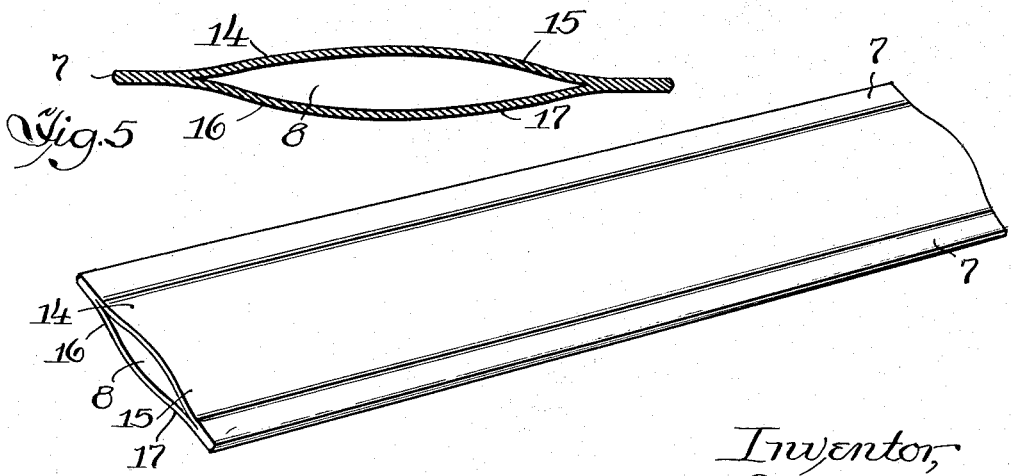
Fig.5
Fig.6
Inventor,
Alfred W. Russell
By: Schneider & Dressler,
Attys.

United States Patent Office 2,742,388
Patented Apr. 17, 1956

2,742,388

REINFORCED PLASTIC STRUCTURAL MEMBER

Alfred W. Russell, Farmingdale, N. Y., assignor to Russell Reinforced Plastics Corporation, a corporation of New York Application June 18, 1954, Serial No. 437,682

14 Claims. (Cl. 154—110)

This invention relates to reinforced plastic structural members and to the method of making the same.

Reinforced plastic sheet products having light transmitting qualities, high strength-weight ratios, impact resistance and ease of workability are desirable as durable, permanently colored members of varied structural and ornamental value in the building construction field as louvers, jalousies, wall panels, door panels, patio and other roofing members, shower stall panels, and similar articles, particularly where light and/or ventilation control is desired. The plastic sheet products of the present invention have these desirable characteristics and are suitable for the uses named as well as other uses in the building construction and other fields.

The use of plastic or reinforced plastic sheet products in the building materials field has heretofore been seriously restricted because of the low modulus of elasticity in bending of such products, even when reinforced in manners known to the art. The present invention contemplates bonding and curing two or more sheets of plastic material into a form that will increase the modulus of deflection far beyond the increase that occurs naturally from the additional thickness of plastic material, and will provide a member of great strength and dimensional stability which has sufficient rigidity to permit its use as a structural member.

The structural member is similar in shape to that disclosed in my co-pending application Serial No. 419,720 filed March 30, 1954, but in the present case the shape is obtained without the necessity of using a reinforcing member.

In accordance with the present invention, two or more thicknesses of plastic material capable of polymerizing and/or curing to a rigid solid state, each thickness being reinforced with a thermoplastic fiber, are bonded together only at their contiguous lateral edges and cured. Although thermoplastic resin may be used as the plastic material, it is preferred to use a thermosetting resin, such as a liquid, polymerizable resinous material capable of curing to a rigid, solid, resinous state. If the resin used is one which will adhere to metal, the mold in which laminating and curing is effected is preliminary coated with a suitable mold release agent to prevent adherence of the resin thereto, in accordance with conventional procedures.

The center portions of the layers of plastic material, throughout the length thereof, are kept from adhering by the use of a separating sheet which will not dissolve in the resin and to which the resin will not adhere, or will adhere to only an insubstantial extent. The separating sheet may be removed, but if it is transparent or translucent, such as cellophane, for example, it may remain in place without adverse effect on the finished product.

After the laminate has been bonded together along two opposite edges and cured, a forming tool of suitable shape is inserted within the pocket between the unbonded portions. The laminate is then heated to the softening point of the thermoplastic fibers which are embedded in the resin. The laminate will assume the desired shape and, after cooling, will retain the shape when the forming tool is removed.

The structure by means of which the above and other advantages of the invention are attained, and the various materials that may be used in the manufacture of the structural member, will be fully described in the following specification, taken in conjunction with the accompanying drawing showing preferred illustrative embodiments of the invention, in which:

Figure 1 is a diagrammatic view of the arrangement of the various components in one method of making the laminate and providing the lengthwise non-adhered area or pocket therein;

Fig. 2 is a fragmentary cross sectional view through the laminate;

Fig. 3 is a perspective view of the laminate, a portion being broken away to show the pocket;

Fig. 4 is a cross sectional view showing the laminate in a mold with the forming tool inserted in the pocket of the laminate;

Fig. 5 is a cross sectional view of the structural member after the forming tool has been removed from its pocket; and Fig. 6 is a perspective view of the structural member.

In a preferred form of the invention a layer 2 of thermoplastic fiber is laid on a plate 3 having a smooth, flat surface which may be treated to keep the resin from adhering thereto. The plate forms the bottom wall of a mold. As illustrated the mold is an open mold, but it may be a closed mold, if desired. The smooth, flat surface of plate 3 may be polished metal, but I prefer to apply a sheet 4 of cellophane or similar material to which the resin will not adhere during curing, on the metal plate and place the fiber on the cellophane sheet. Examples of other materials which may be used are polyvinylalcohol film, wax, lubricating material, and other mold release agents conventionally used in the resin molding art. The area of the sheet 4 of cellophane or like material is preferably larger than the area of the layer of fiber, for a reason hereinafter disclosed.

Various types of thermoplastic fiber which have proved to be satisfactory include nylon, rayon, acrylic fiber (a copolymer of vinyl chloride and acrylonitrile) commercially available under the trademark "Dynel," acrylic fiber (formed from a polymer of acrylonitrile) commercially available under the trademark "Orlon," and polyvinylidene chloride-polyvinyl chloride copolymer fiber commercially available under the trademark "Saran." The fibers may be mixed, or may be of a single kind, and may be woven or non-woven. Ordinarily the fiber sheet or mat is in the form of a single layer, but a multiplicity of layers may be used, if desired.

A suitable resin 5 is then poured on the film mat to impregnate the same and/or fill the interstices thereof. Although a thermoplastic resin may be used, I prefer to use any thermosetting resin in a viscous liquid state, such as a partially polymerized resinous liquid material capable of curing to a rigid, solid resinous state. Examples of such thermosetting resins are epoxy resins which are presently sold by Ciba Company, Inc. under the trademark "Araldite" and by Shell Chemical Corp. under the trademark "Epon." These resins have a tendency to adhere to metal during curing, but not if the metal is coated with wax, lubricating material or other mold release agents conventionally used in the resin molding art. Other desirable thermosetting resins which may be used in accordance with the invention are polymerizable unsaturated alcohol polyesters of polybasic acids such as phthalic, terephthalic, oxalic, carbonic, succinic, sebacic, azelaic and adipic acids, including diallyl oxalate, diallyl carbonate, diallyl succinate, diallyl adipate, diallyl maleate, diallyl fumarate, diallyl itaconate, ethylene glycol bis (allyl carbonate), diethylene glycol bis (allyl carbonate), and mixtures thereof. Still other desirable resins are polymerizable unsaturated alcohol esters of unsaturated acids such as the esters of vinyl, allyl, methallyl, beta ethyl allyl, crotyl, propargyl, methyl propargyl, phenyl propargyl, oleyl, linoleyl, ricinoleyl, or cinnamyl alcohol and unsaturated acids such as acrylic, methacrylic, alpha or beta chloracrylic, crotonic or cinnamic acids, including allyl acrylate, allyl alpha chloracrylate, etc.

And still other desirable thermosetting resins are polyhydric alcohol esters of unsaturated acids such as acrylic, methacrylic, alpha or beta chloracrylic, fumaric, maleic, itaconic, crotonic, etc. and polyhydric alcohols such as ethylene glycol, diethylene glycol, triethylene glycol, hexaethylene glycol, propylene glycol, dipropylene glycol, glycerol, sorbitol, and mannitol, including ethylene glycol diacrylate, etc.

Polyhydric alcohol polyesters of polybasic acids are also desirable thermosetting resins which may be used in accordance with the present invention. These include esters of the above mentioned polyhydric alcohols and maleic, itaconic, citraconic, or fumaric acids. Such esters may include alkyds such as ethylene glycol maleate or fumarate or compounds such as ethylene glycol bis (ethylene fumarate), etc., and esters formed by the reaction of polyhydric alcohol-unsaturated dibasic acid esters having an acid number below about 150 with a monohydric alcohol such as methyl, ethyl or propyl alcohol in an amount sufficient to reduce the viscosity, and the monobasic reaction products thereof, as described in Patent No. 2,418,633 issued to Charles Gould.

It is also possible to use polymerizable ethers including divinyl ether, etc. and copolymers of the ethers and any of the above compounds, or other organic compounds containing two or more unsaturated, unconjugated groups, including divinyl naphthalene, divinyl benzene, divinyl acetylene, vinyl acetylene, etc.

Glycerol phthalate, liquid phenol-aldehyde resins, melamine-aldehyde condensation products and urea condensation products, alone or in admixture with the above compounds containing one or more polymerizable groups are additional examples of liquid polymerizable or condensable materials capable of curing to a thermosetting state which may also be used.

Solid or semi-solid polymerizable resinous compositions may be dissolved in polymerizable liquids or in plasticizers to provide the necessary fluidity. Liquid compositions that are too fluid to be used may be partially polymerized or may be blended with more viscous materials to attain the desired viscosity for impregnating the fiber mat. Such fluid compositions may be partially polymerized with heat in the presence of catalysts such as benzoyl peroxide, acetone peroxide, lauroyl peroxide, or methyl ethyl ketone peroxide. For example, diallyl phthalate containing 5 per cent by weight of benzoyl peroxide may be heated at 80 to 85° C. in a flask provided with a glass tube having two spaced marks. The diallyl phthalate is drawn up in the tube and allowed to flow back, the time required for the liquid to flow between the two marks being observed with a stop watch. The liquid is stirred during the heating, and when the time for the flow between the two marks increases to 15 times the initial time required at the beginning of the heating period, the composition is sufficiently viscous for use in accordance with the invention and may be cooled to room temperature.

After the fiber mat has been thoroughly impregnated and covered with resin, a strip 6 of cellophane or similar material that will not adhere to the resin when it is cured, of less width than the fiber mat, is placed centrally on top of the impregnated mat and then an additional layer 2 of fibers is superimposed over the impregnated mat and the cellophane. Another application of resin 5 is poured over the second layer of fiber to impregnate and cover it. If additional thickness is desired, the process may be repeated, with or without the inner strip of cellophane, depending on the pocket structure desired. Strip 6 is of at least the same length as the layers of fiber but is of less width and is centrally disposed with respect to the longitudinal edges of the fiber layers, so that when the mass is cured the longitudinal edges of the resin impregnated layers will be bonded together, and the central portion coincident with the area of the cellophane strip will be separated to form an open ended pocket. Another plate 3 is placed over the uppermost layer of resin impregnated fibers with a sheet 4 of cellophane or similar material interposed between the resin and the smooth, flat surface of the plate. The weight of the upper plate, with the addition of pressure if required, will squeeze any excess resin from the layers of fiber to the sides of the fibers and between the overlapping cellophane sheets to provide beads of resinous material laterally of the laminate which seal the same against entry of air during the curing process. The projecting areas of cellophane sheets 4 preferably are sufficiently extensive to prevent any of the excess resin from coming in contact with plates 3. Plates 3 may be part of a mold, or may be placed in a suitable mold, and the mold may then be heated to cure the resin, if heating is required for curing.

The curing or setting of the resin may be effected without applied pressure, depending only on the weight of the upper plate 3 and/or the top of the mold, or with an applied pressure of up to about 300 pounds per square inch. Higher pressures can be used, if desired, but with the polymerizable resins presently available this is not necessary. For example, using a viscous, liquid, polymerizable type of resin, such as ethylene glycol maleate alkyl, I prefer to effect the curing of the resin at zero pounds applied pressure or low applied pressures up to about 250 pounds per square inch.

The curing bonds the resin and fiber into a unitary structure having a single thickness, indicated at 7, separated only along its central longitudinal area contiguous to cellophane sheet 6 to form an open ended pocket 8 extending longitudinally of the unit. When the unit is removed from the mold after curing, cellophane sheet 6 may be removed, but is preferably left in place because, being transparent, it does not detract from the appearance of the finished product.

A forming tool 9 is inserted into pocket 8 and the laminate, with the forming tool in place, is inserted between two plates 10 and 11, which may be parts of a mold or may be inserted into a mold. Plates 10 and 11 are recessed, as indicated at 12 and 13, respectively, to conform to the shape of the laminate with the forming tool in pocket 8. The insertion of forming tool 9 into pocket 8 stretches the separated portions of the plastic sheets and puts them under tension. The forming tool shapes the separated portions of the plastic sheets into "Witch of Agnesi" curves 14, 15, 16 and 17.

The laminate, with forming tool 9 in pocket 8, is heated to the softening point of the thermoplastic fibers used, and is then cooled to allow the laminate to set. Forming tool 9 is then removed, and the laminate retains the shape shown in Figs. 5 and 6. The "Witch of Agnesi" curves serve to provide a structure of great strength and rigidity to make the product useful as a structural member.

The structural member may be formed of more than two layers of fiber reinforced plastic and provided with a multiplicity of pockets 8. It will be obvious that pockets 8 may have any desired relationship, depending upon the positioning of the strips of cellophane or the like before the mass is cured, but for maximum strength each pocket should be defined by plastic shaped into "Witch of Agnesi" curves. The only necessary restriction is that the portions of the plastic layers contiguous to the longitudinal edges of each pocket must be free of interposed cellophane in order to bond the layers together at their longitudinal edges when the mass is cured.

Although I have illustrated only one method of forming the laminate of layers of definite size, it will be understood that the laminate may be formed of indeterminate length in a continuous process, as described in my above identified copending application.

While I have described several preferred embodiments of my invention in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

I claim:

1. The method of forming a plastic structural member which comprises the steps of superimposing two layers of resin reinforced with thermoplastic fiber with a strip of material non-adherent to said resin of less width than said layers of resin interposed therebetween, said layers of resin extending beyond the longitudinal edges of said non-adherent strip, bonding the longitudinal edges of said resinous layers together with a pocket extending longitudinally between said bonded edge portions, separating oppositely facing surfaces of said pocket, inserting a forming tool in said pocket, heating said member to the softening point of said thermoplastic fiber to impart a predetermined cross sectional shape to said pocket, and cooling said member with said pocket in said predetermined shape.

2. The method of forming a plastic structural member which comprises the steps of superimposing two layers of a polymerizable resin reinforced with thermoplastic fiber with a strip of material non-adherent to said resin and of less width than said layers of resin interposed therebetween, positioning a sheet of material non-adherent to said resin adjacent the outer surface of each of said layers of resin, said layers of resin extending beyond the longitudinal edges of said non-adherent strip, each of said non-adherent sheets extending beyond each edge of said layers of resin, curing said resin to bond the longitudinal edges of said resinous layers together and form a pocket extending longitudinally between said bonded edge portions, separating oppositely facing surfaces of said pocket, inserting a forming tool in said pocket, heating said member to the softening point of said thermoplastic fiber to impart a predetermined cross sectional shape to said pocket, and cooling said member with said pocket in said predetermined shape.

3. The method of forming a plastic structural member which comprises the steps of superimposing two layers of a polymerizable resin reinforced with thermoplastic fiber with a strip of material non-adherent to said resin and of less width than said layers of resin interposed therebetween, positioning a sheet of material non-adherent to said resin adjacent the outer surface of each of said layers of resin, said layers of resin extending beyond the longitudinal edges of said non-adherent strips, each of said last named non-adherent sheets extending beyond each edge of said layers of resin, curing said resin to bond the longitudinal edges of said resinous layers together and form a pocket extending longitudinally between said bonded edge portions, inserting a forming tool in said pocket to separate said pocket portions and curve them transversely from the longitudinal center toward said bonded edge portions, heating said member to the softening point of said thermoplastic fiber with said forming tool in said pocket, cooling said member to set said thermoplastic fiber, and removing said forming tool from said pocket.

4. The method of forming a reinforced plastic structural member which comprises placing a layer of thermoplastic fiber on a sheet of material non-adherent to resin with the sheet of non-adherent material extending beyond each edge of said layer of fiber, impregnating said fiber with a liquid, polymerizable resin, placing a strip of material non-adherent to resin over said resin, said layer of resin and fiber extending beyond the longitudinal edges of said strip and said strip extending at least to each of the other edges of said layer of resin and fiber, superimposing another layer of thermoplastic fiber on said layer of resin and fiber and said non-adherent strip, impregnating said last mentioned layer of fiber with a liquid, polymerizable resin, placing another sheet of material non-adherent to resin over said last mentioned layer of resin and fiber with its edges extending beyond each edge thereof, curing said mass to bond the longitudinal edges of said layers of resin and fiber with a pocket defined by said strip of material non-adherent to resin extending longitudinally between said bonded edges, forcing said pocket portions open to form transversely curved pocket portions, heating said member to the softening point of said thermoplastic fiber with said pockets held in open transversely curved shape, and then cooling said member to set said thermoplastic fiber with said pockets in said transversely curved shape.

5. The method of forming a plastic structural member which comprises placing a layer of thermoplastic fiber on a sheet of material non-adherent to resin with the sheet of non-adherent material extending beyond each edge of said layer of fiber, impregnating said fiber with a liquid polymerizable resin, placing a strip of material non-adherent to resin over said resin, said layer of resin and fiber extending beyond the longitudinal edges of said strip and said strip extending at least to each of the other edges of said layer of resin and fiber, superimposing another layer of thermoplastic fiber on said layer of resin and fiber and said non-adherent strip, impregnating said last mentioned layer of fiber with a liquid polymerizable resin, placing another sheet of material non-adherent to resin over said last mentioned layer of resin and fiber with its edges extending beyond each edge thereof, curing said mass to bond the longitudinal edges of said layers of resin and fiber with a pocket defined by said strip of material non-adherent to resin extending longitudinally between said bonded edges, inserting a forming tool in said pocket to separate said pocket portions and curve them transversely from the longitudinal center toward said bonded edge portions, heating said member to the softening point of said thermoplastic fiber with said forming tool in said pocket, cooling said member to set said thermoplastic fiber, and removing said forming tool from said pocket.

6. The method of forming a plastic structural member which comprises interposing a narrow strip of material non-adherent to resin between layers of thermosetting resin reinforced with thermoplasitc fiber and curing the fiber reinforced resin to a thermoset state to bond opposite longitudinal edges of said resin together, separating the layers of fiber reinforced resin in the area defined by said strip of non-adherent material to curve said fiber reinforced resin transversely from the center line of said separated layers to said bonded longitudinal edges, heating said member to the softening point of said thermopalstic fiber with the layers held in separated position, and then cooling said member to set said thermoplastic fiber.

7. The method of forming a plastic structural member which comprises interposing a narrow strip of material non-adherent to resin between layers of thermosetting resin reinforced with thermoplastic fiber and curing the fiber reinforced resin to a thermoset state to bond opposite longitudinal edges of said resin together, inserting a forming tool between the layers of fiber reinforced resin in the area defined by said non-adherent strip to separate said layers of fiber reinforced resin between said bonded edges and to curve them symmetrically in a transverse direction, heating said member to the softening point of said thermoplastic fiber, cooling said member to set said thermoplastic fiber, and then removing said forming tool.

8. The method of forming a plastic structural member which comprises the steps of superimposing two layers of a thermoplastic fibrous material impregnated with a liquid polymerizable resinous material capable of being cured to a solid, rigid state with a strip of material non-adherent to said resinous material and of less width than said fibrous impregnated layers interposed therebetween, said fibrous impregnated layers extending beyond the longitudinal edges of said non-adherent strip, and curing said resinous material to a solid, rigid state to bond the longitudinal edges of said fibrous layers together with a pocket extending longitudinally between said bonded edges, separating oppositely facing surfaces of said pocket into predetermined cross sectional shape, heating said member to the softening point of said thermoplastic fibrous material with the oppositely facing surfaces of said pocket held in said predetermined cross sectional shape, and cooling said member to set said pocket in said predetermined shape.

9. The method of forming a plastic structural member which comprises the steps of superimposing two layers of a thermoplastic fibrous material impregnated with a liquid polymerizable resinous material capable of being cured to a solid, rigid state with a strip of cellophane of less width than said fibrous impregnated layers interposed therebetween, said fibrous impregnated layers extending beyond the longitudinal edges of said cellophane strip, and curing said resinous material to a solid, rigid state to bond the longitudinal edges of said fibrous layers together with a pocket extending longitudinally between said bonded edges, separating oppositely facing surfaces of said pocket into predetermined cross sectional shape, heating said member to the softening point of said thermoplastic fibrous material with the oppositely facing surfaces of said pocket held in said predetermined cross sectional shape, and cooling said member to set said pocket in said predetermined shape.

10. The method of forming a plastic structural member which comprises the steps of superimposing two layers of a thermoplastic fibrous material impregnated with a liquid polymerizable resinous material capable of being cured to a solid, rigid state with a strip of material non-adherent to said resinous material and of less width than said fibrous impregnated layers interposed therebetween, said fibrous impregnated layers extending beyond the longitudinal edges of said non-adherent strip, and curing said resinous material to a solid, rigid state to bond the longitudinal edges of said fibrous layers together with a pocket extending longitudinally between said bonded edges, inserting a forming tool in said pocket to separate said pocket portions and curve them transversely from the longitudinal center towards said longitudinal edge portions, heating said member to the softening point of said thermoplastic fibrous material with said forming tool in said pocket, cooling said member to set said thermoplastic fibrous material, and removing said forming tool from said pocket.

11. The method of forming a plastic structural member which comprises the steps of superimposing two layers of a thermoplastic fibrous material impregnated with a liquid polymerizable resinous material capable of being cured to a solid, rigid state with a strip of cellophane of less width than said fibrous impregnated layers interposed therebetween, said fibrous impregnated layers extending beyond the longitudinal edges of said cellophane strip, and curing said resinous material to a solid, rigid state to bond the longitudinal edges of said fibrous layers together with a pocket extending longitudinally between said bonded edges, inserting a forming tool in said pocket to separate said pocket portions and curve them transversely from the longitudinal center towards said longitudinal edge portions, heating said member to the softening point of said thermoplastic fibrous material with said forming tool in said pocket, cooling said member to set said thermoplastic fibrous material, and removing said forming tool from said pocket.

12. A reinforced plastic structural member comprising a laminate of plastic material, comprising thermosetting resin reinforced with thermoplastic fibrous matter, bonded together along its longitudinal edge portions with its longitudinally extending center portion separated, the plastic material defining said longitudinally extending separated center portion being curved transversely to provide increased resistance to deflection.

13. A plastic structural member comprising a plurality of layers of thermosetting resin reinforced with thermoplastic fiber bonded together along their longitudinal edge portions and provided with a longitudinally extending pocket in its center portion, oppositely facing surfaces of said pocket being separated, the maximum separation being along the longitudinal center line, and said separated portions each being curved symmetrically along transverse lines sweeping from said point of maximum separation towards said bonded longitudinal edge portions to provide increased resistance to deflection.

14. A plastic structural member comprising a laminate of thermosetting plastic material reinforced with thermoplastic fibers and bonded together along a plurality of longitudinally extending areas, and a plurality of longitudinally extending pockets, the opposite longitudinal edges of each of said pockets being each defined by one of said bonded areas, and said pockets being set in open position with the plastic material of the pocket curved transversely in symmetrical shape to increase the resistance of said structural member to deflection.

References Cited in the file of this patent

UNITED STATES PATENTS 2,608,502     Merriman     Aug. 26, 1952